United States Patent
Gratsias et al.

(10) Patent No.: US 11,850,764 B2
(45) Date of Patent: Dec. 26, 2023

(54) METHOD OF MANUFACTURING A SHAVER

(71) Applicant: BIC-VIOLEX SA, Anixi (GR)

(72) Inventors: Spiros Gratsias, Athens (GR); Ioannis Marios Psimadas, Athens (GR); Efstratios Christofidellis, Kifisia (GR); Ioannis Bozikis, Athens (GR); Anestis Tsegenidis, Athens (GR)

(73) Assignee: BIC Violex Single Member S.A., Anoixi (GR)

( * ) Notice: Subject to any disclaimer, the term of this patent is extended or adjusted under 35 U.S.C. 154(b) by 279 days.

(21) Appl. No.: 16/492,391

(22) PCT Filed: Mar. 9, 2018

(86) PCT No.: PCT/EP2018/055932
§ 371 (c)(1),
(2) Date: Sep. 9, 2019

(87) PCT Pub. No.: WO2018/162723
PCT Pub. Date: Sep. 13, 2018

(65) Prior Publication Data
US 2020/0039100 A1 Feb. 6, 2020

(30) Foreign Application Priority Data

Mar. 10, 2017 (EP) .................... 17160416
Mar. 10, 2017 (EP) .................... 17160417

(51) Int. Cl.
*B26B 21/52* (2006.01)
*G05B 19/4099* (2006.01)
(Continued)

(52) U.S. Cl.
CPC .......... *B26B 21/528* (2013.01); *B29C 64/393* (2017.08); *B33Y 50/02* (2014.12);
(Continued)

(58) Field of Classification Search
CPC ... B26B 21/528; B26B 21/521; B26B 21/522; B33Y 50/02; B33Y 80/00; B29C 64/393;
(Continued)

(56) References Cited

U.S. PATENT DOCUMENTS

| 950,113 A | 2/1910 | Osborn |
| 4,309,821 A | 1/1982 | Terry et al. |

(Continued)

FOREIGN PATENT DOCUMENTS

| CN | 1262643 A | 8/2000 |
| CN | 101115593 A | 1/2008 |

(Continued)

OTHER PUBLICATIONS

Mendoza, "RZR MKR 3D Design Competition from Gillette, 3D Hubs and MakersCAFE—Design a 3D Printed Razor Handle", pp. 4, Jul. 2016, downlaoded from the internet https://3dprint.com/142340/rzr-mkr-design-competition/ (Year: 2016).*

(Continued)

*Primary Examiner* — Christopher E. Everett
*Assistant Examiner* — Olvin Lopez Alvarez
(74) *Attorney, Agent, or Firm* — Bookoff McAndrews, PLLC

(57) ABSTRACT

A method of manufacturing a shaver element including at least a shaver handle element (2) for a wet shaver, comprising a digital fabrication step (123) wherein said shaver element is made by digital fabrication technology.

20 Claims, 8 Drawing Sheets

(51) Int. Cl.
*B33Y 50/02* (2015.01)
*B33Y 80/00* (2015.01)
*B29C 64/393* (2017.01)
*B29L 31/00* (2006.01)

(52) U.S. Cl.
CPC .......... *B33Y 80/00* (2014.12); *G05B 19/4099* (2013.01); *B26B 21/521* (2013.01); *B26B 21/522* (2013.01); *B29L 2031/769* (2013.01); *G05B 2219/35134* (2013.01); *G05B 2219/49007* (2013.01)

(58) Field of Classification Search
CPC ...... G05B 19/4099; G05B 2219/35134; G05B 2219/49007; B29L 2031/769
See application file for complete search history.

(56) References Cited

U.S. PATENT DOCUMENTS

| | | | |
|---|---|---|---|
| 4,432,136 A | | 2/1984 | Taylor |
| 5,784,785 A | | 7/1998 | Polites |
| D483,526 S | * | 12/2003 | Efthimiadis ................ D28/48 |
| D635,302 S | * | 3/2011 | Psimadas .................. D28/48 |
| 8,234,789 B2 | * | 8/2012 | Avens .................. B26B 21/443 30/50 |
| D668,816 S | * | 10/2012 | Psimadas .................. D28/48 |
| 8,800,113 B1 | | 8/2014 | Charvet |
| 2003/0046819 A1 | | 3/2003 | Ferraro et al. |
| 2004/0177518 A1 | | 9/2004 | Leventhal |
| 2010/0319204 A1 | * | 12/2010 | Peterson ............... B29C 64/153 30/346.58 |
| 2012/0023762 A1 | * | 2/2012 | Furuta .................. B25G 1/102 30/526 |
| 2013/0081291 A1 | * | 4/2013 | Wain .................. B26B 21/4025 30/531 |
| 2014/0083265 A1 | | 3/2014 | Provost et al. |
| 2014/0172170 A1 | | 6/2014 | Yoo |
| 2015/0113795 A1 | | 4/2015 | Depallens et al. |
| 2016/0069051 A1 | * | 3/2016 | McHale ............... B29C 64/153 137/597 |
| 2016/0101531 A1 | | 4/2016 | Bunnell |
| 2016/0121497 A1 | | 5/2016 | Johnson |
| 2016/0183672 A1 | * | 6/2016 | Samaroo ............... B65B 63/005 382/182 |
| 2016/0374431 A1 | | 12/2016 | Tow |
| 2017/0001321 A1 | * | 1/2017 | Shorey ................ B26B 21/4037 |
| 2017/0173809 A1 | * | 6/2017 | Psimadas .............. B26B 21/521 |
| 2017/0231794 A1 | | 8/2017 | Church |
| 2017/0265849 A1 | * | 9/2017 | Assaf ............... A61B 17/12136 |
| 2018/0029310 A1 | * | 2/2018 | Friend ................ B26B 21/528 |
| 2018/0243158 A1 | * | 8/2018 | Loghmani ............. A61H 7/005 |
| 2018/0257249 A1 | | 9/2018 | Wattam |
| 2019/0333284 A1 | * | 10/2019 | Abunojaim ......... G06F 3/04815 |

FOREIGN PATENT DOCUMENTS

| | | | | |
|---|---|---|---|---|
| CN | 204851575 U | | 12/2015 | |
| CN | 106061693 A | | 10/2016 | |
| DE | 3019416 A1 | | 11/1980 | |
| DE | 29709361 U1 | | 8/1997 | |
| EP | 2711146 A1 | | 3/2014 | |
| GB | 543801 A | | 3/1942 | |
| GB | 1520834 A | | 8/1978 | |
| GB | 2100646 A | | 1/1983 | |
| KR | 20160147532 | * | 12/2016 | ............ B29C 67/00 |
| WO | 2006081842 A1 | | 8/2006 | |
| WO | 2008042184 A1 | | 4/2008 | |
| WO | 2010037418 A1 | | 4/2010 | |
| WO | WO2015128000 | * | 9/2015 | ............ B26B 21/52 |
| WO | 2016023118 A1 | | 2/2016 | |

OTHER PUBLICATIONS

Heater, "Gillette partners with Formlabs to 3D print razor handles", pp. 2, Oct. 2018, downloaded from the internet https://techcrunch.com/2018/10/17/gillette-partners-with-formlabs-to-3d-print-razor-handles/?renderMode=ie11 (Year: 2018).*
Meshlab, "Creating Voronoi Sphere", 2009 pp. 2 downloaded from the internet http://meshlabstuff.blogspot.com/2009/03/creating-voronoi-sphere.html (Year: 2009).*
International Search Report and Written Opinion dated Jun. 12, 2018, in International Application No. PCT/EP218/055932 (8 pages).
European Search Report issued in corresponding European Application No. 17160417, dated Jun. 19, 2018.
First Search issued in CN2018800098877 dated Mar. 12, 2020 (2 pages).
First Search issued in corresponding Chinese application No. 2018800098877, dated Dec. 3, 2020, pp. 2.
International Search Report and Written Opinion dated May 29, 2018, in International Application No. PCT/EP218/055929 (9 pages).
Search Report issued in European Application No. 17 16 0416 dated Aug. 11, 2017 (2 pages).
Search Report issued in European Application No. 17 16 0417 dated Jun. 8, 2018 (1 page).
Supplemental Search issued in CN2018800098877 dated Jul. 26, 2021 (1 page).
Supplemental Search issued in corresponding Chinese application No. 2018800098877, dated Jul. 26, 2021, p. 1.

* cited by examiner

METHOD OF MANUFACTURING A SHAVER

CROSS REFERENCE TO RELATED APPLICATIONS

This application is a National Stage Application of International Application No. PCT/EP2018/055932, filed on Mar. 9, 2018, now published as WO2018/162723 and which claims priority to European Application No. 17160416.8, filed Mar. 10, 2017, and European Application No. 17160417.6, filed Mar. 10, 2017.

FIELD

The disclosure relates to methods of manufacturing shaver elements and to shaver elements manufactured according to such methods, said shaver elements including at least a shaver handle.

BACKGROUND

Shaver handle elements (i.e., a shaver handle or part of a shaver handle) are usually plastic molded parts, injection molded as a single part or sometimes molded as several parts which are later assembled.

WO2006081842 shows an example of a known shaver handle element.

One purpose of the present concept is to improve the manufacturing of shaver handle elements of the prior art, at least with regard to material consumption and/or economy and/or easiness of manufacturing and/or improved aesthetics.

SUMMARY OF THE DISCLOSURE

To this end, the present description proposes a method of manufacturing a shaver element including at least a shaver handle element for a wet shaver, said method comprising a digital fabrication step wherein said shaver element is made by digital fabrication based on a digital file.

Digital fabrication, as referred to here, may designate any additive manufacturing technology. Additive technology is often also called three dimensional (3D) printing. A 3D printer, as referred to here, may designate any machine for digital fabrication.

Although shaver handle elements may be subject to relatively high mechanical stress, shaver handle elements obtained by the method of the present disclosure turned out to fulfill all mechanical requirements of shaver handle elements.

The method according to the disclosure enables to manufacture the shaver handle element easily and without costly investment. In particular, no mold has to be designed, manufactured and stored, contrary to current methods of manufacturing shaver handle elements.

The overall manufacturing cost may be lower than with injection molding, at least for relatively small production volumes.

The proposed method further provides more manufacturing flexibility, since the shape of the handle element can be modified easily without having to invest in new molds and/or change molds installed on injection molding machines as in the current situation.

Further, each 3D printer can be switched very easily from one type of handle element to another, simply by sending to the 3D printer a new data file corresponding to the handle element to manufacture. The manufacturing facility thus becomes very versatile and can be continuously adapted to demand.

Further, since the manufacturing facility requires lower investment and relatively easy maintenance, it may be decentralized and located closer to the customer, thus enabling better and quicker delivery to the customer, less delivery costs and a more environmentally friendly process.

Additionally, digital fabrication may enable to manufacture shaver handle elements in one piece even in case the shape thereof is unmoldable because of complex geometry, or in case the material thereof is unmoldable. More generally, digital fabrication makes the design of the handle element more flexible and simpler, since it is not subject to the limitations of injection molding in terms of tooling (injection molding requires machines and molds with cavities and inserts for each part), in terms of geometry (injection molding requires specific geometry to enable the parts to be unmolded), or otherwise. The geometry of the handle may thus be optimized so that the handle uses less material than a handle manufactured by injection molding, while fulfilling the same mechanical requirements and functionalities.

The method described hereafter may also enable to design and manufacture handle elements as a single piece even in some cases where the handle element includes moving parts, which would not be possible with injection molding. The manufacturing process is thus made simpler and less costly, since it does not require separate manufacture, handling and assembly of parts.

Embodiments of such method may incorporate one or more of the following features:

said shaver handle element is a shaver handle handle with at least on attachment element for attaching a shaver head;

at said printing step, said shaver handle element is made in one piece with at least part of a shaver head adapted to receive shaving blades;

said printing step is carried out by using a digital fabrication technology chosen among additive manufacturing technologies such as material extrusion (e.g. fused deposition modeling, etc.), material jetting, VAT photopolymerization (e.g. digital light processing and electron beam melting, stereolithography, etc.), sheet lamination, direct energy deposition, powder bed fusion (e.g. laser sintering, etc.) and binder jetting;

at said digital fabrication step, the handle element is made at least partly of metal;

at said digital fabrication step, the shaver element is made of at least two distinct materials (but it can be also made of only one material);

said at least two materials include an elastomeric material, and at said digital fabrication step, the shaver element is made in one piece with at least two rigid portions joined by an elastic portion made of said elastomeric material, said elastic portion enabling relative movement between said rigid portions;

the method further comprises an order process which includes a connection step wherein a customer connects to a server to order said shaver element, said digital fabrication step being launched as a result of the order process;

in said order process, the customer communicates with the server via a web interface or a mobile application;

the order process further including the following steps:
a production site selection step wherein a production site is chosen, a drawing dispatching step wherein digital models are sent to the chosen production site, said digital fabrication step is carried out at the chosen production step based on the 3D digital models;

at said production site selection step, the customer may choose between digital fabrication in a shaver factory and at least one of digital fabrication on a public 3D printer and digital fabrication on a private 3D printer;

the order process further includes a customization step wherein the customer may customize the shaver element via a 3D interface enabling the customer to view the customized shaver element in 3D;

at said customization step, the user is able to customize at least one of a material of the shaver element, a color of the shaver element dimensions and/or shape (114a) of the shaver element, and special graphics of the shaver element;

the order process further includes a possibility for the customer to upload 3D digital models on the server and wherein said digital fabrication step is carried out based on said 3D digital models.

Besides, the disclosure also concerns a shaver element made in one piece with at least two rigid portions joined by an elastic portion made of elastomeric material, said elastic portion enabling relative movement between said rigid portions.

In embodiments, the shaver element includes a releasable head to handle attachment having a body, at least one attachment element (for instance two arms) movably supported by the body between an active locking position where said at least one attachment element is adapted to bear a shaver head and a release position where said at least one attachment element is adapted to release said shaver head, an actuation member adapted to mechanically actuate (directly or indirectly) the at least one attachment element, said actuation member being adapted to be manually actuated by a user for moving the at least one attachment element in the release position, said elastic portion being interposed between the actuation member and the body to bias the actuation member in a rest position corresponding to the active position of the at least one attachment element.

The above and other objects and advantages of the disclosed method will become apparent from the detailed description of one embodiment thereof, considered in conjunction with the accompanying drawings.

DETAILED DESCRIPTION

Figure 1:
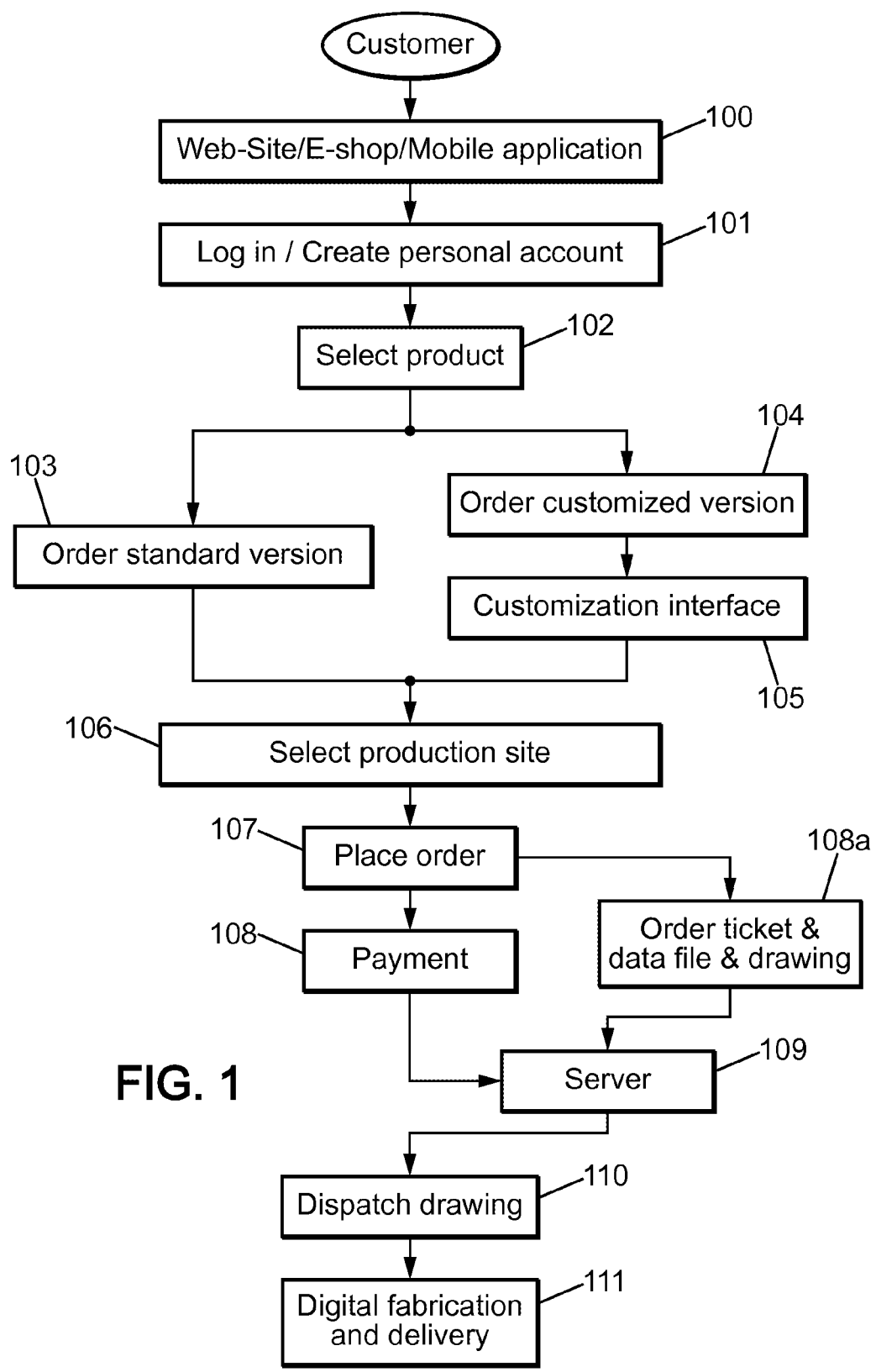
FIG. 1 is a block diagram illustrating a method of manufacturing a shaver element according to embodiments of the disclosure.

In the drawings, the same reference numerals denote identical or similar elements.

The below description, concerns in particular a method of manufacturing a shaver element.

Figure 8:
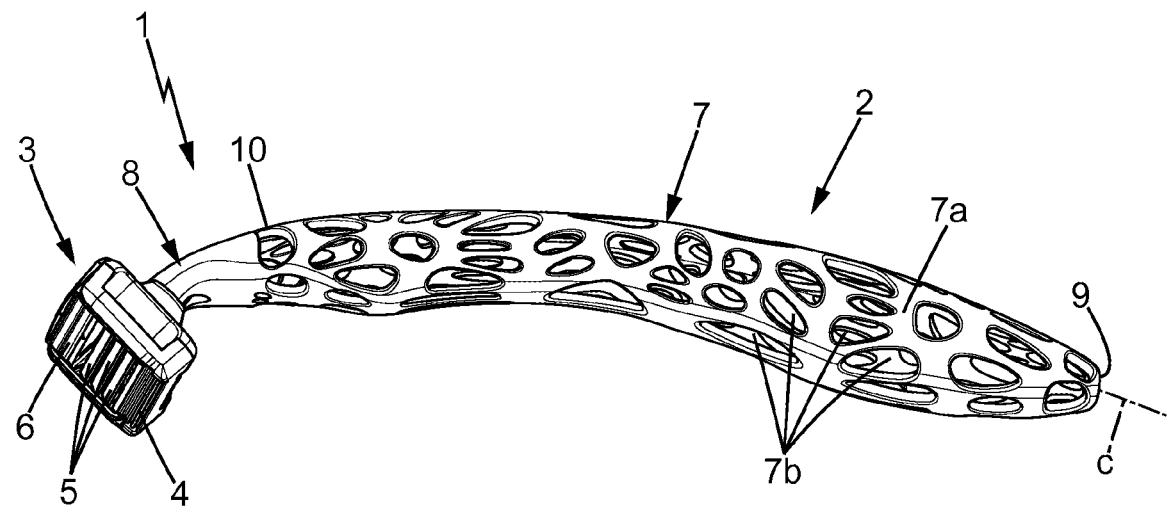
FIG. 8 is an overall perspective view of a shaver having a shaver element which may be manufactured according to the disclosed method.
Figure 9:
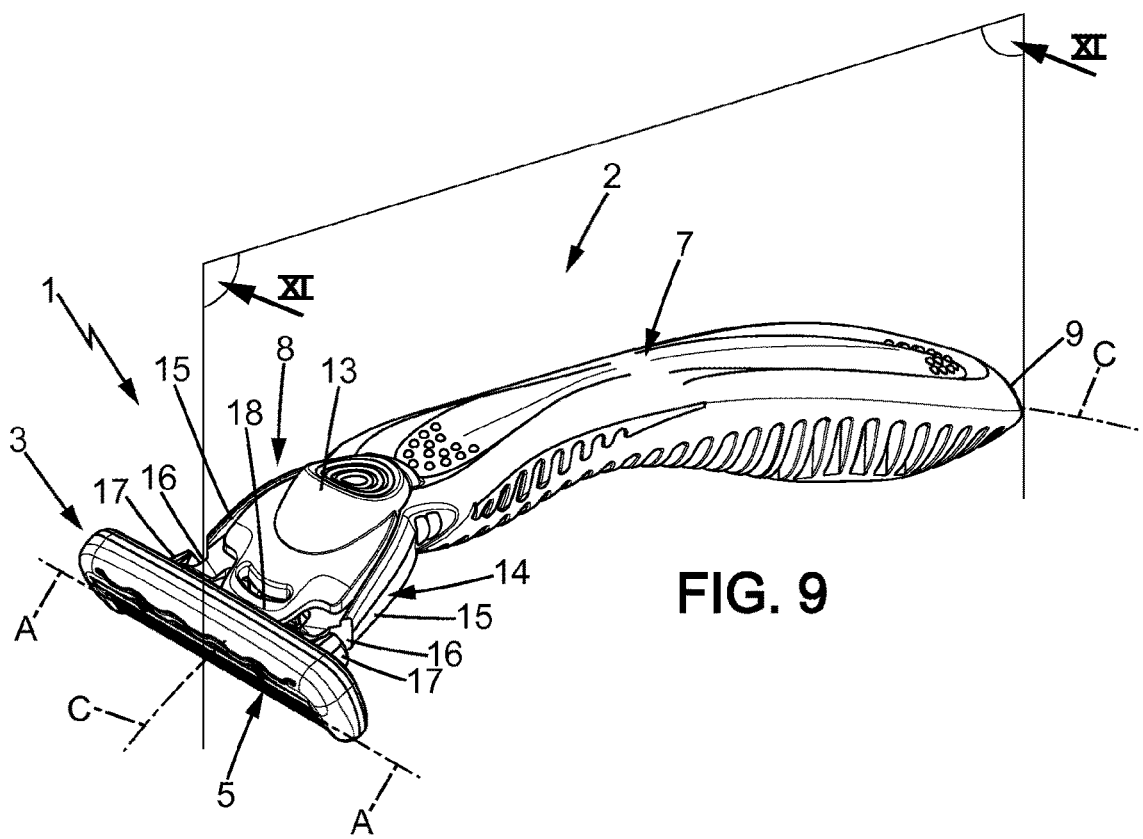
FIG. 9 is an overall perspective view of a shaver having a shaver element which may be manufactured according to the disclosed method, with the shaver head mounted on the shaver handle.
Figure 10:
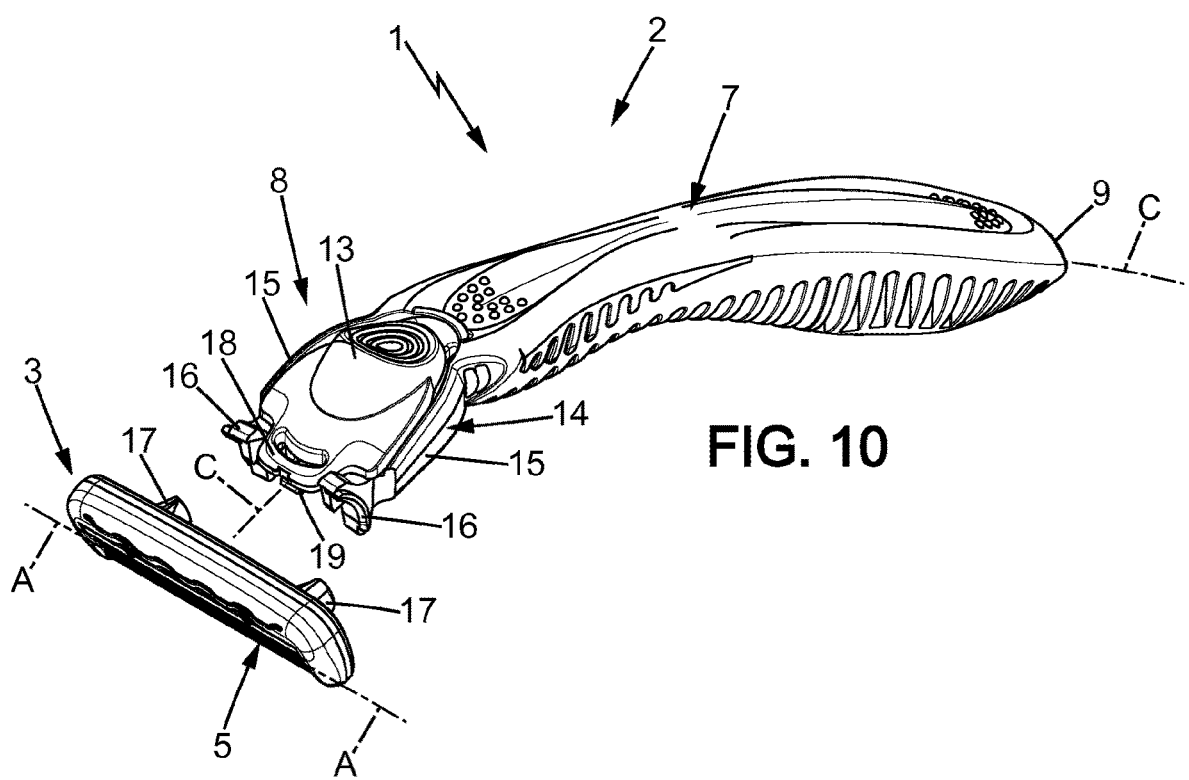
FIG. 10 is a view similar to FIG. 9, with the shaver head released from the shaver handle.
Figure 11:
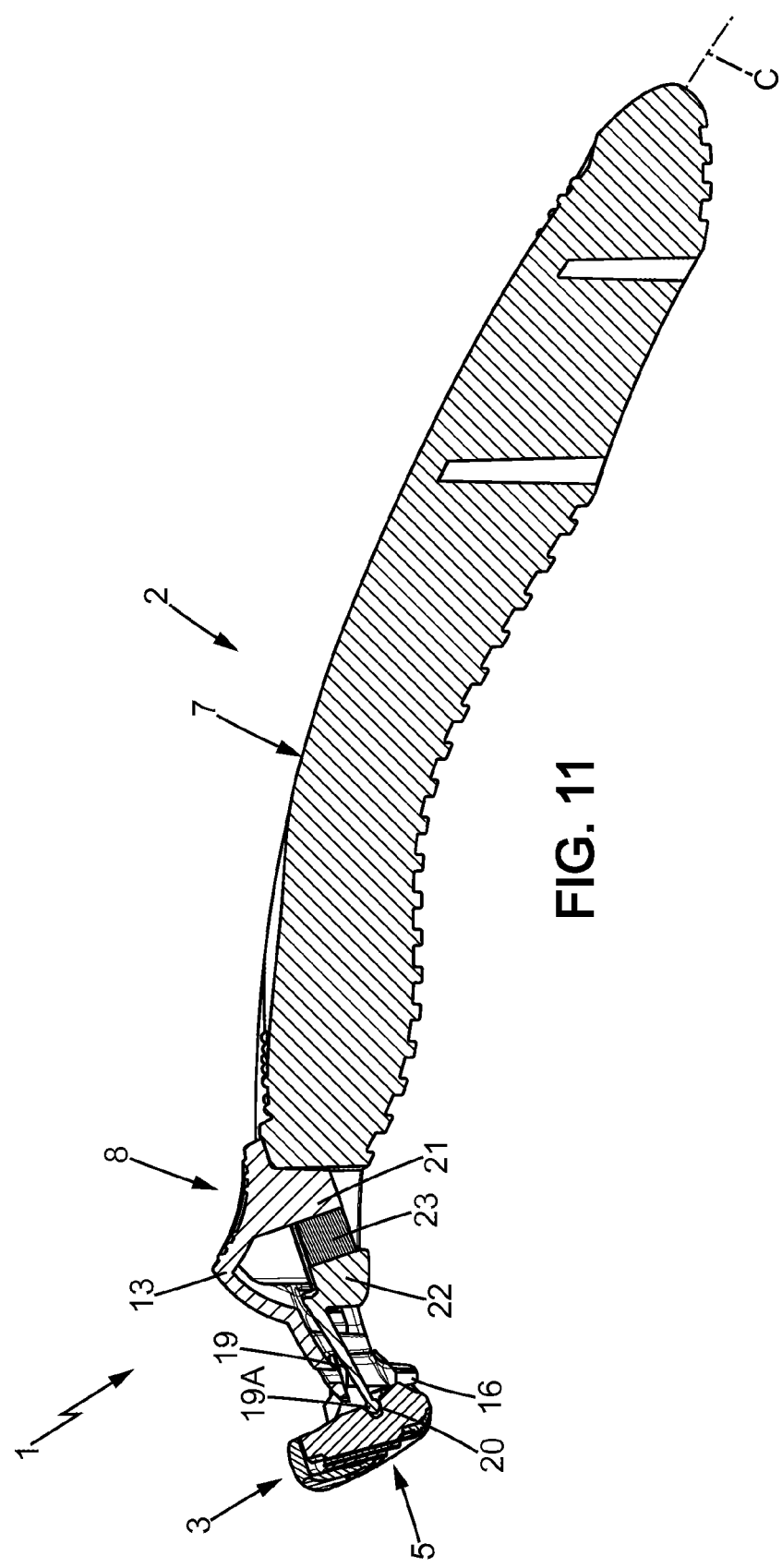
FIG. 11 is a section view of the shaver of FIGS. 9 and 10, the shaver being cut in the plane XI-XI of FIG. 9.

The shaver element can be part or the entirety of a shaver 1, as illustrated for instance on FIG. 8 or on FIGS. 9-11. The shaver 1 comprises at least a shaver handle 2 and a shaver head 3. The shaver head 3 may have a guard bar 4, one or several blades 5 and possibly a cover 6 or similar. The shaver head 3 may be a stand alone part or comprise an interconnecting member. The handle 2 may comprise an elongated handle body 7 and a head supporting portion 8 bearing the shaver head 3.

The handle body 7 is adapted to be held in hand by a user. The handle body 7 extends between a distal end 9 (opposite the head portion 8) and a proximal end 10 (close to the head supporting portion 8), along a central line C. The central line C may be curved. The central line C may be included in a sagittal plane.

The shaver head 3 may be connected to the head supporting portion 8 by any known way, for instance enabled to pivot around a pivot axis perpendicular to the sagittal plane, or otherwise.

The shaver element as manufactured by the method, preferably includes a shaver handle element. The shaver handle element includes at least part of the shaver handle 2.

In some embodiments, the shaver handle element includes the complete shaver handle 2, including at least one attachment element for attaching the shaver head 3.

In some embodiments, the shaver handle element may include only part of the shaver handle 2.

In some embodiments, the shaver element may also include at least part of the shaver head 3.

The shaver element may be formed in one piece.

The shaver element is formed by digital fabrication as defined above, also called additive manufacturing.

The shaver element may be formed in one or several materials, including any material compatible with at least one method of digital fabrication. For instance, the shaver element 2 may be formed in one or several of the following materials: plastic materials, metals, mixtures of synthetic and natural materials including wood, glass and paper, etc.

In some embodiments, the shaver element may be made of at least two distinct materials. Said at least two materials may include an elastomeric material. In specific embodiments, the shaver element may be made in one piece with at least two rigid portions joined by an elastic portion made of said elastomeric material, said elastic portion enabling relative movement between said rigid portions. An example of such specific embodiment will be described below with regard to FIGS. 9-11.

In another embodiment the handle may be produced around or at least partially around any object (e.g. an insert made of any known material) entrapping it and enabling it to move freely in the end product.

One example of a method of manufacturing and delivering a shaver element is illustrated at FIG. 1.

In the example of FIG. 1, a customer follows an order process to order a certain quantity of shaver element(s), and then the shaver element(s) is printed by digital fabrication and delivered.

In the order process, the customer may first go through a connection step, which may include for instance the following substeps:

A substep 100 of launching an interface such as a web interface (web site/E-shop) or a mobile application;

A substep 101 wherein the customer logs in if he or she already has a personal account, or creating a personal account.

At step 102, the customer may then select the product to be manufactured through the interface, i.e. at least the shaver element to be manufactured.

Once the product is chosen, the customer may choose, via the interface, either to order a standard version of the product at step 103, or to order a customized version of the product at step 104. In that case, the customer may go through a customization step 105 using a customization interface.

Figure 2:
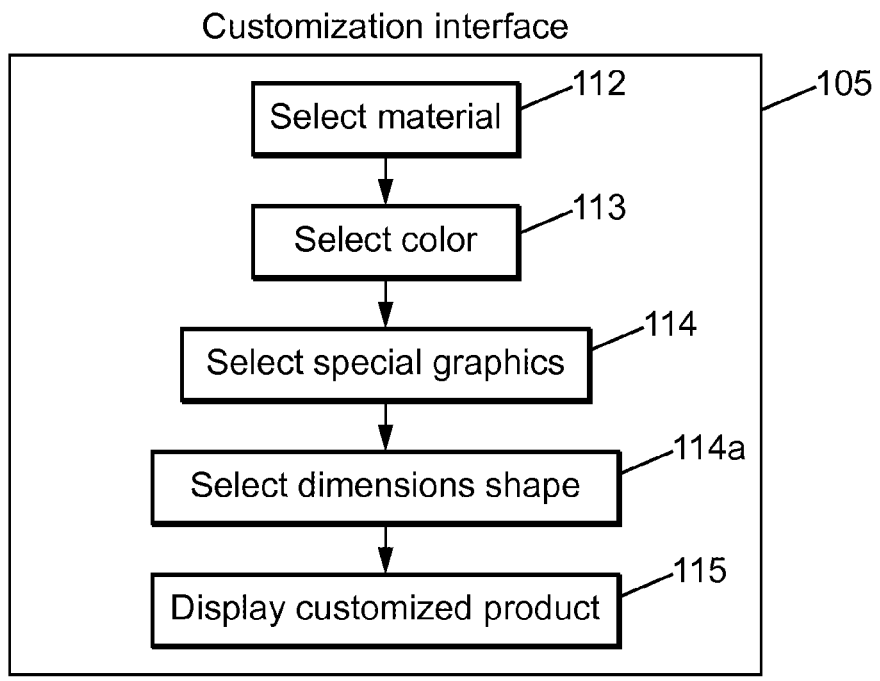
FIG. 2 is a detail of step 105 of FIG. 1.

One example of such customization step 105 is shown at FIG. 2.

At said customization step 105, the user may customize at least one of a material of the shaver element (at substep 112), a color of the shaver element (at substep 113), dimensions and/or shape of the shaver element (at substep 114*a*—e.g. internal or external dimensions, Voronoi diagram, gripping features etc. and special graphics of the shaver element (at substep 114).

At said customization step 105, the customer may customize the shaver element via a 3D interface enabling the customer to view the customized shaver element in 3D digital view (at substep 115). The customer validates the customized shaver element at the end of the customization step 105, once he or she is satisfied with the customized shaver element.

Figure 3:
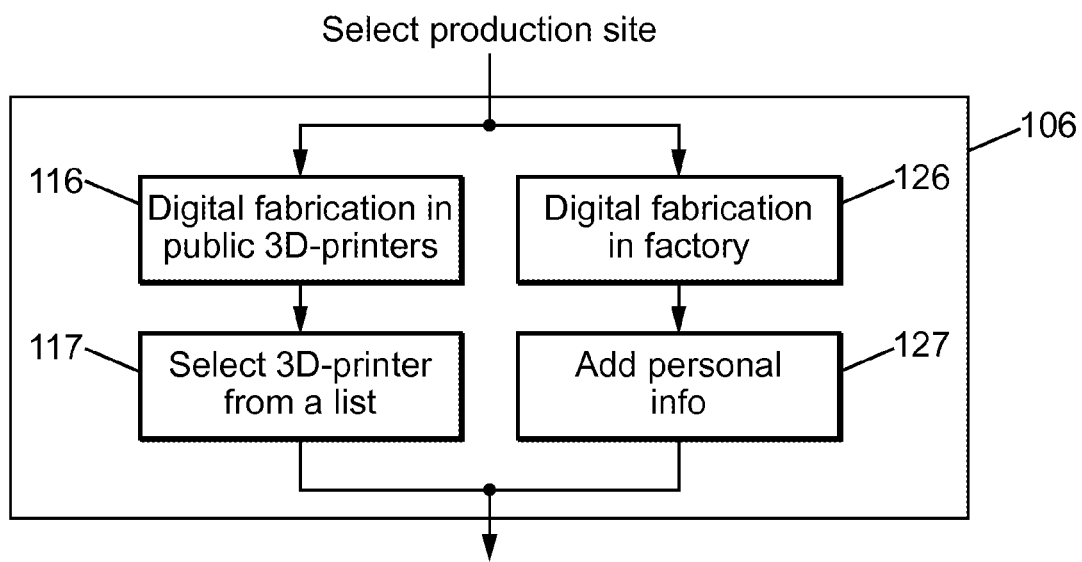
FIG. 3 is a detail of step 106 of FIG. 1.

Coming back to FIG. 1, the order process may include a production site selection step 106 wherein a production site is chosen. An example of such production site selection step 106 is illustrated at FIG. 3.

At said production site selection step 106, the customer may be able to choose, via the interface, between fabricating on a public 3D printer (step 116) and fabricating in a shaver factory (step 126). If the user chooses to digital fabricate on a public 3D printer, he or she may choose the private 3D printer from a list, at step 117. If the user chooses to fabricate in a shaver factory, he or she may add personnel information via the interface, at step 127.

Coming back to FIG. 1, once the order is complete, the user may place the order at step 107 via the interface. The user may then pay the order at a payment step 108 and payment is confirmed to the server 109. Also, an order ticket, a data file and 3D drawings corresponding to the ordered shaver element(s) may be sent to the server 109 at step 108*a*.

Figure 4:
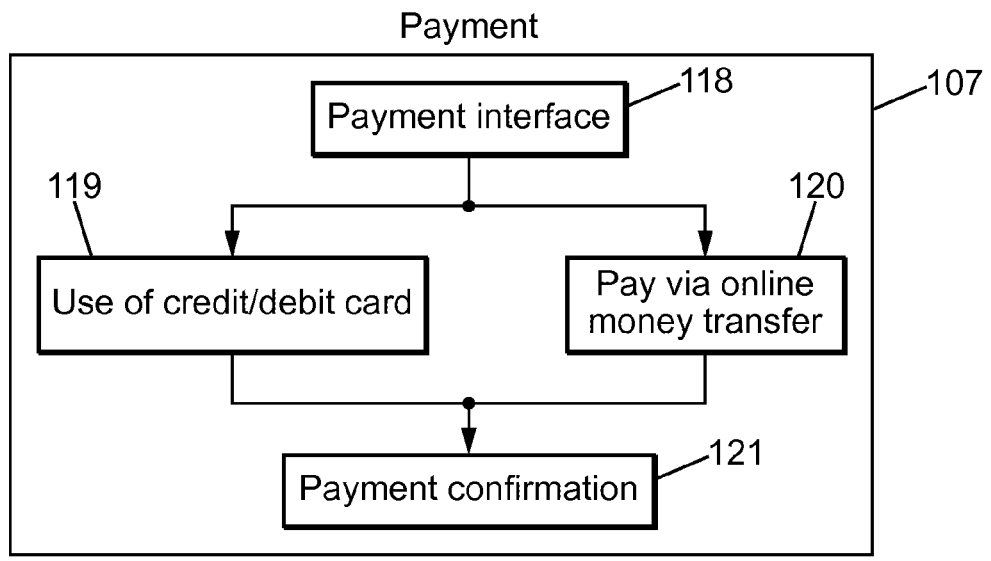
FIG. 4 is a detail of step 107 of FIG. 1.

An example of the payment step 107 is illustrated at FIG. 4. The payment may be done through a payment interface 118, offering for instance to pay either by credit/debit card at substep 119, or via online money transfer (e.g. PayPal® or similar) at substep 120, or otherwise. A payment confirmation may be received at substep 121.

Coming back to FIG. 1, once the order has been validated on server 109, server 109 dispatches the 3D digital models to the adequate 3D printer at step 110 and the shaver element(s) is/are digital fabricated on the 3D printer and delivered at a digital fabrication and delivery step 111.

Figure 5:
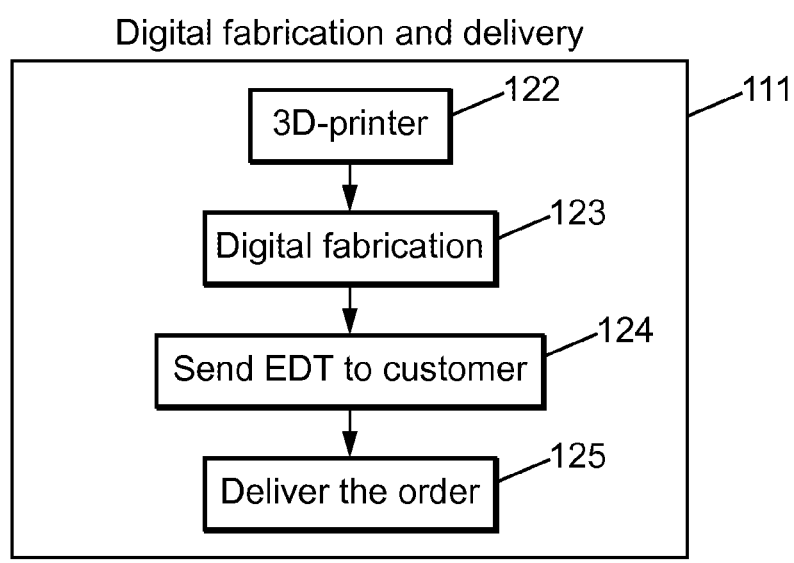
FIG. 5 is a detail of step 111 of FIG. 1.

An example of the digital fabrication and delivery step 111 is illustrated at FIG. 5:

The 3D digital models are received by the chosen 3D printer 122;

The shaver element is digital fabricated at digital fabrication step 123;

An Estimated Delivery Time is sent to the customer at substep 124;

The order is delivered to the customer at substep 125.

Figure 6:
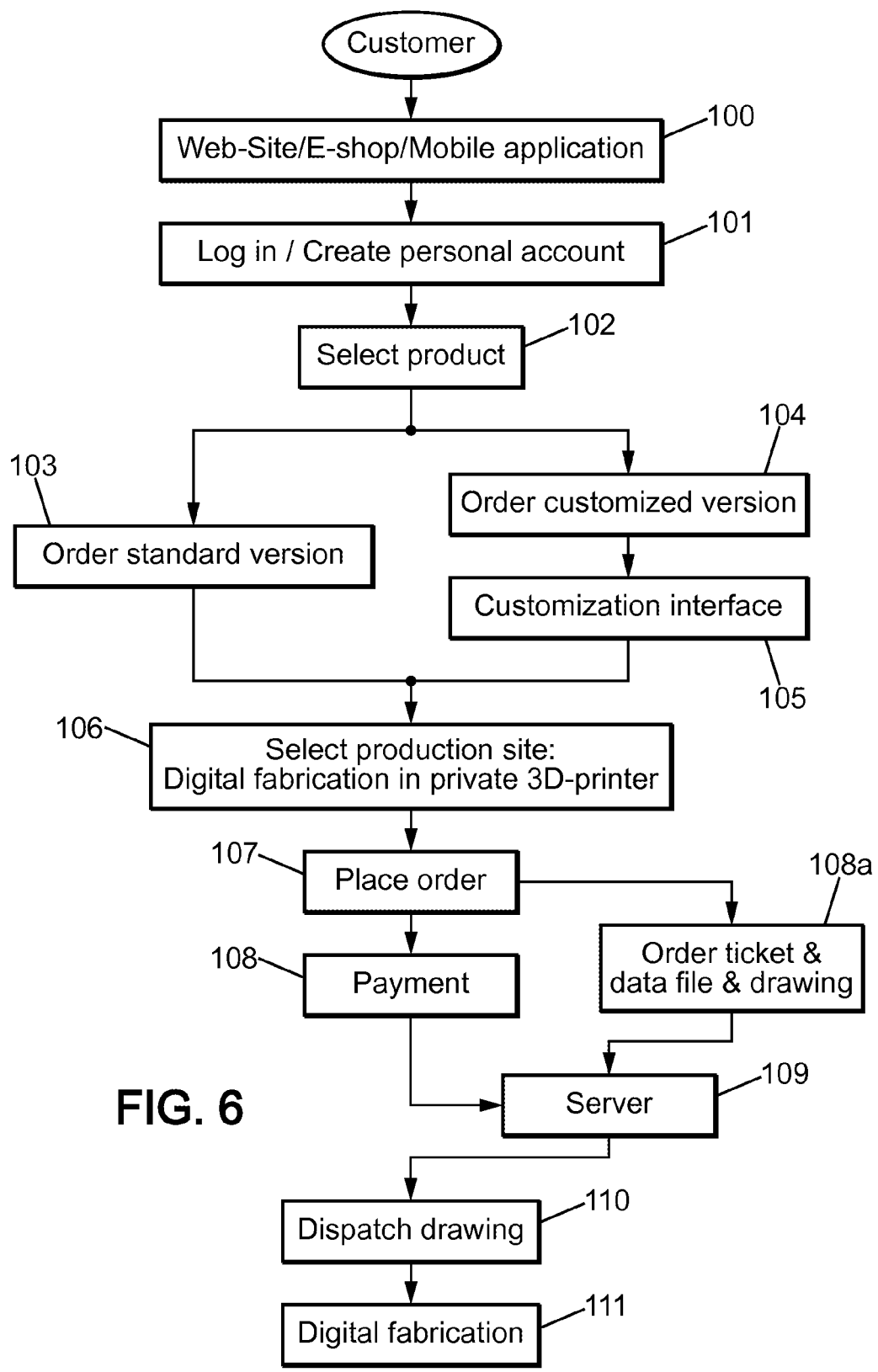
FIGS. 6 and 7 are block diagrams similar to FIG. 1, showing two variants of the method described.

A variant of the manufacturing method of FIG. 1 is illustrated at FIG. 6. In the variant of FIG. 6, at the production site selection step 106, the interface may allow the customer to choose digital fabrication on a private 3D printer, e.g. his or her own 3D printer. This possibility may be considered/added to the possibilities already described regarding the production site selection step 106. The rest of the method may be similar to the method of FIG. 1 and will not be described again here.

Figure 7:
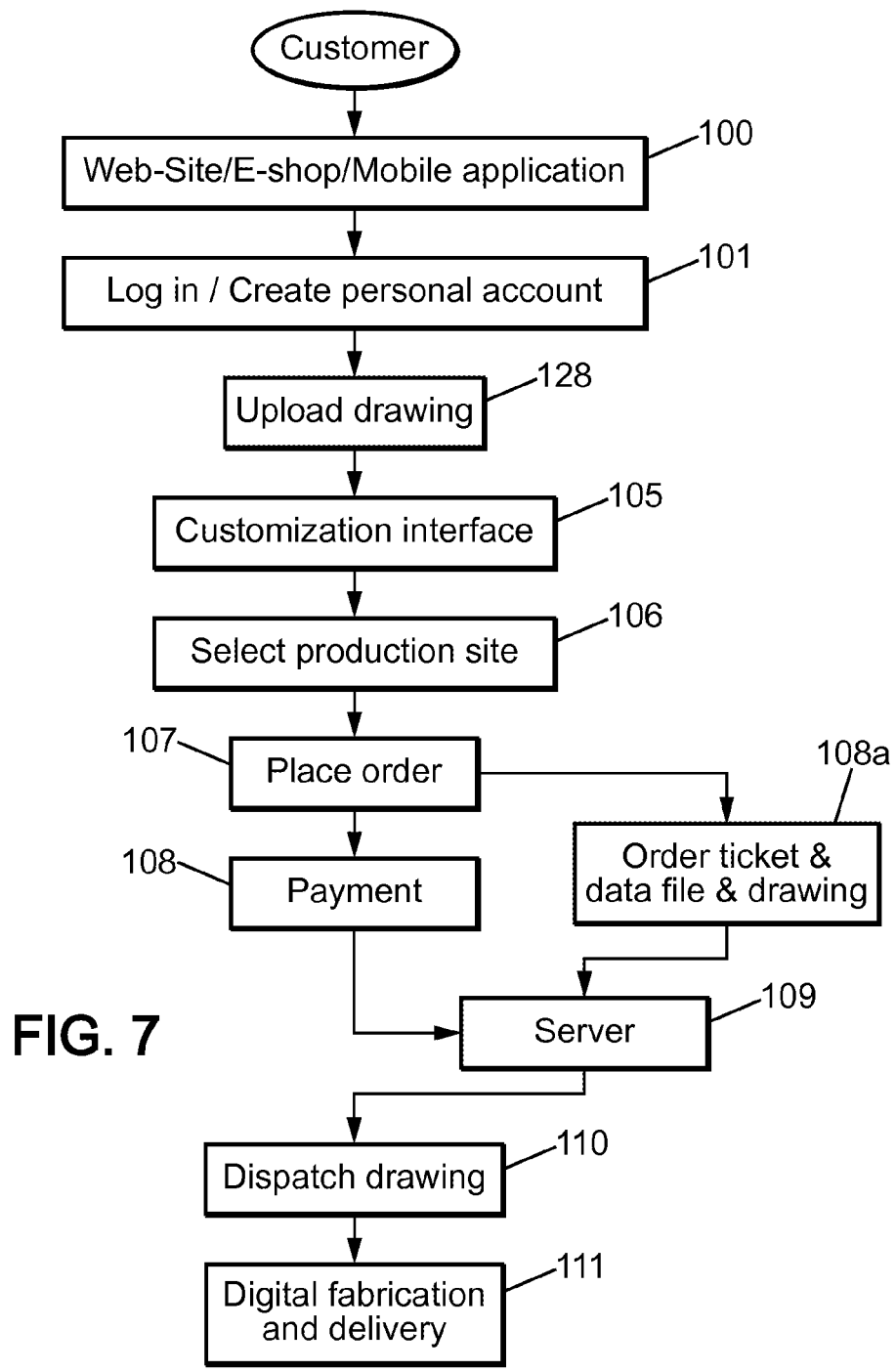

Another variant is illustrated at FIG. 7. The variant of FIG. 7 differs from the method of FIG. 1 in the fact that steps 102-105 are replaced by a step 128 where the customer may upload 3D digital models on the server 109 via the interface, and then the uploaded 3D digital models may be digital fabricated on the 3D printer. This step 128 may be proposed simultaneously with said steps 102-105, as an alternative, by the interface. The rest of the method may be similar to the method of FIG. 1 and will not be described again here.

FIG. 8 and FIGS. 9-11 show respectively two examples of shaver elements which may be manufactured by a method as described above.

In the case of FIG. 8, the handle body 7 may have a cell structure 7*a*, 7*b* formed by juxtaposed hollow cells 7*b*, at least partly separated by solid walls 7*a*.

The solid walls 7*a* may advantageously form a continuous, single solid part.

The solid walls 7*a* may form a network of solid threads or arms which are connected together.

Advantageously, the cell structure 7*a*, 7*b* may be formed based on a Voronoi diagram.

In a particularly advantageous embodiment, as shown in FIG. 8, said cell structure 7*a*, 7*b* is a grid shell structure. Such grid shell structure forms a continuous skin or shell which extends on the outside surface of the handle body, thus defining the external shape of the handle body 7 and surrounding an inner volume of the handle body. In that case, the above mentioned hollow cells 7*b* are formed in the grid shell structure and are open toward the inner volume and at the outside surface. In that case, said solid walls 7*a* define the thickness of the grid shell structure.

In the example of FIG. 8, the inner volume is empty and free of solid walls. In other embodiments, not shown, the inner volume may include solid walls belonging to the cell structure and defining empty cells, for instance according to a 3D Voronoi diagram.

In another embodiment, one or more various inserts may be included in the empty inner volume. Each insert may be able to move freely in the empty volume or it may be fixed on a specific place in order to enhance ergonomy.

The shaver handle 2 of FIG. 8 may be manufactured in one piece by the method of the present disclosure, which would not be possible by injection molding.

In the case of FIGS. 9-11, the shaver handle 2 or at least the head supporting portion 8 thereof may be manufactured according to the present disclosure as one single piece, with at least two distinct materials including for instance a plastic material and an elastomeric material.

The shaver 1 of FIGS. 9-11 may be similar to the one disclosed in WO2010037418A1.

The head supporting portion 8 may form a releasable head to handle attachment. More particularly, the shaver head 3 may be releasable from the head supporting portion 8 by actuation of an actuation member 13 such as an actuation button 13.

The shaver head 3 may be pivotally mounted on at least one attachment element belonging to the head supporting portion 8, for instance two lateral arms 15. The shaver head 3 may be elastically biased to a rest position by a free end 19A of an elastic tongue 19 also belonging to the head supporting portion 8.

The lateral arms 15 may for instance have shell bearings 16 cooperating with complementary shell bearings 17 for pivotally supporting the shaver head 3.

The head supporting portion 8 may include a body 22 formed in plastic material with the tongue 19 and the lateral arms 15, said lateral arms 15 being elastically movable between an active position (FIG. 9) where said lateral arms 15 bear the shaver head 3 and a release position (FIG. 10) where said lateral arms 15 release said shaver head 3.

The head supporting portion 8 further includes the actuation member 13, which may be mechanically coupled with the lateral arms 15 for instance as disclosed in WO2010037418A1. The actuation member 13 is adapted to be manually actuated by a user for moving the lateral arms 15 in the release position. The actuation member 13 may include a pusher 18 to eject the shaver head 3 when the actuation member 13 is actuated. The actuation member 13 may also be formed in plastic material.

The head supporting portion 8 may further include an elastic portion 23 of elastomeric material, interposed between the actuation member 13 and the body 22. More particularly, the elastic portion 23 may be interposed between a rear portion 21 of the actuation member 13 and the body 22. The elastic portion 23 allows movement of the actuation member 13 forward in the longitudinal direction of the shaver handle when the actuation member 13 is actuated. The elastic portion 23 also biases the actuation member 13 in a rest position corresponding to the active position of the arms. The elastic portion and the whole mechanism may be produced by a digital fabrication method, according to the method described above, in one step. In this case there is no need for assembly of the mechanism.

Of course, the present disclosure is not limited to the particular head to handle attachment features, it may be applicable to any head to handle attachments, including more complex head to handle attachments.

The invention claimed is:

1. A method of producing a shaver handle for a wet shaver, comprising: a step of using a digital file to digitally fabricate the shaver handle to include a varied arrangement of juxtaposed hollow cells and solid walls formed about a portion of the shaver handle, wherein the shaver handle includes an enclosed inner volume.

2. The method according to claim 1, wherein the shaver handle includes at least one attachment element for attaching a shaver head.

3. The method according to claim 2, wherein the step of using the digital file to digitally fabricate the shaver handle includes forming the shaver handle in one piece with at least part of the shaver head.

4. The method according to claim 1, wherein the step of using the digital file to digitally fabricate the shaver handle is carried out by using digital fabrication technology selected from a group consisting of material extrusion, material jetting, VAT photopolymerization, sheet lamination, direct energy deposition, powder bed fusion, and binder jetting.

5. The method according to claim 1, wherein the step of using the digital file to digitally fabricate the shaver handle includes forming the shaver handle using at least two materials.

6. The method according to claim 5, wherein the shaver handle is formed in one piece, and the at least two materials include an elastomeric material and a plastic material.

7. The method according to claim 1, wherein the shaver handle is configured to enclose one or more inserts that are freely movable within the enclosed inner volume.

8. The method according to claim 7, wherein the shaver handle further includes the one or more inserts within the enclosed inner volume.

9. The method according to claim 8, wherein using the digital file to digitally fabricate the shaver handle includes forming the handle around the one or more inserts.

10. The method according to claim 9, wherein:
the shaver handle extends from a proximal end toward a distal end;
the proximal end is configured to be coupled to a shaver head;
the inner volume extends to the distal end of the shaver; and
one or more hollow cells are at or adjacent to the distal end of the shaver.

11. The method of claim 1, wherein:
the shaver handle extends from a proximal end toward a distal end;
the proximal end is configured to be coupled to a shaver head; and
the inner volume extends to the distal end of the shaver.

12. The method of claim 11, further including one or more hollow cells at or adjacent to the distal end of the shaver.

13. The method of claim 1, wherein a shape of the handle is based on a Voronoi diagram.

14. The method of claim 1, wherein the shaver handle is a grid shell.

15. The method according to claim 1, wherein the method further includes:
receiving a selection of a private 3D printer or a public 3D printer where the shaver handle will be printed; and
sending the digital file to a private 3D printer or a public 3D printer based on the selection.

16. The method according to claim 1, wherein the method further includes:
electronically receiving input relating to customization of the shaver handle from a user;
enabling the user to view a 3D representation of the shaver handle based on the received input; and
electronically receiving a validation of the 3D representation of the shaver handle from the user after enabling the user to view the 3D representation.

17. A method of producing a shaver handle for a wet shaver, comprising: a step of using a digital file to digitally fabricate the shaver handle to include a varied arrangement of juxtaposed hollow cells and solid walls formed about a portion of the shaver handle, wherein the shaver handle includes an enclosed inner volume connected to the hollow cells, and the shaver handle is configured to enclose an object that is freely movable within the inner volume.

18. The method according to claim 17, wherein the shaver handle further includes the object.

19. A method of producing a shaver handle for a wet shaver, comprising: a step of using a digital file to digitally fabricate the shaver handle to include a plurality of openings extending through an outer surface of the shaver handle, wherein the shaver handle includes an enclosed inner volume connected to the openings, and the shaver handle is configured to enclose an object that is freely movable within the inner volume.

20. The method according to claim 19, wherein the shaver handle further includes the object.

\* \* \* \* \*